United States Patent
Kozanda et al.

(10) Patent No.: US 9,003,968 B2
(45) Date of Patent: Apr. 14, 2015

(54) SCREW EXTRUDER

(75) Inventors: Christian Kozanda, Feistritz/Wechsel (AT); Dietmar Strecker, Felixdorf (AT); Ewald Kern, Laxenburg (AT); Manfred Zabl, Vienna (AT)

(73) Assignee: Applied Chemicals Handels—GmbH, Vienna (AT)

( * ) Notice: Subject to any disclaimer, the term of this patent is extended or adjusted under 35 U.S.C. 154(b) by 0 days.

(21) Appl. No.: 14/118,962

(22) PCT Filed: May 16, 2012

(86) PCT No.: PCT/AT2012/000135
§ 371 (c)(1),
(2), (4) Date: Feb. 4, 2014

(87) PCT Pub. No.: WO2012/171046
PCT Pub. Date: Dec. 20, 2012

(65) Prior Publication Data
US 2014/0158001 A1    Jun. 12, 2014

(30) Foreign Application Priority Data

May 20, 2011    (AT) .................................. GM293/2011

(51) Int. Cl.
*B30B 9/12*   (2006.01)
*B60K 15/03*   (2006.01)
*B60K 15/04*   (2006.01)

(52) U.S. Cl.
CPC ......... *B30B 9/12* (2013.01); *B60K 2015/03447* (2013.01); *B60K 15/03177* (2013.01); *B60K 2015/0477* (2013.01); *B60K 2015/0496* (2013.01)

(58) Field of Classification Search
CPC ........................................................ B30B 9/12
USPC .......... 100/106, 112, 117, 145, 146; 210/232, 210/236, 408, 413
See application file for complete search history.

(56) References Cited

U.S. PATENT DOCUMENTS

| | | | | |
|---|---|---|---|---|
| 5,186,834 | A | * | 2/1993 | Arai .............................. 210/413 |
| 5,665,232 | A | * | 9/1997 | Schlegel ....................... 210/408 |
| 6,615,710 | B1 | | 9/2003 | Ishigaki et al. |
| 6,767,432 | B1 | * | 7/2004 | Laine et al. .................... 162/243 |
| 7,056,441 | B1 | * | 6/2006 | Menke et al. ................. 210/703 |

(Continued)

FOREIGN PATENT DOCUMENTS

| | | |
|---|---|---|
| DE | 10 2005 057591 A1 | 6/2007 |
| JP | H04-123895 A | 4/1992 |
| JP | 2003-073679 A | 3/2003 |

(Continued)

*Primary Examiner* — Jimmy T Nguyen
(74) *Attorney, Agent, or Firm* — Jacobson Holman, PLLC.

(57) ABSTRACT

In a screw extruder comprising a screw shaft on which at least one screw blade is disposed, a filter screen surrounding the screw shaft and including filter openings is arranged within oppositely located frames and a funnel-shaped filtrate trough is disposed below and on the outer side of the filter screen, the screw shaft is cylindrical in the region of an inlet port, widens conically in its central region, and is cylindrical in the region of the discharge port, and the filtrate trough comprises at least two chambers, which chambers are each provided with a drain for filtrate, and the first chamber in the region of the inlet port has a longitudinal extension corresponding to at least the length of the cylindrical portion of the screw shaft in the same region.

11 Claims, 3 Drawing Sheets

(56) References Cited

U.S. PATENT DOCUMENTS 7,918,347 B2 4/2011 Geisbauer
2007/0029245 A1 2/2007 Kuhn et al.

FOREIGN PATENT DOCUMENTS

RU 2021143 C1 10/1994
WO 01/34374 A1 5/2001

* cited by examiner

SCREW EXTRUDER

This is a national stage of PCT/AT12/000135 filed May 16, 2012 and published in German, which has a priority of Austria no. GM 293/2011 filed May 20, 2011, hereby incorporated by reference.

TECHNICAL FIELD

The present invention relates to a screw extruder including a screw shaft rotationally mounted in oppositely located frames, which screw shaft has a substantially conically widening diameter between a feed opening for crude liquid and a discharge opening for dehydrated material, and on which screw shaft at least one screw blade extending with a substantially uniform pitch is disposed, wherein a filter sieve cylindrically surrounding the screw shaft and having a plurality of filter openings is further arranged in said frame, wherein a cleaning device for the filter sieve, which includes a plurality of cleaning nozzles, and a funnel-shaped filtrate trough disposed below the filter sieve are additionally arranged on the outer side of the filter sieve.

BACKGROUND OF THE INVENTION

Sludges derived from industrial clarification plants, communal sewage plants and various chemical engineering processes have to be dehydrated before being disposed of or finally used in order to be subsequently exploitable. Such exploitation, for instance, involves combustion, composting or even agricultural applications. In this connection, increasing transportation costs involved in sludge disposal have in the past called for the dehydration of the occurring sludges to high final solids contents in order to make them reusable for subsequent exploitations. To this end, polymer coagulation or flocculation aids have been added to the most diverse sludges in order to form flake-containing sludges that will subsequently be more readily dehydratable.

For continuous dehydration, the sludge together with the flocculation aid is applied onto a screw extruder from a feed side and continuously dehydrated to the desired degree of drying or dehydration of the sludge by conveying the latter through the extruder while increasing the dehydration pressure. Since, with such a screw extruder, the solids concentration of the sludge is low on the side of the feed opening into the extruder and continuously increases towards the discharge side, a large amount of water is to be immediately discharged in the region of the feed opening, which filtrate water, unlike the water present in screw extruder regions located farther away from the feed opening, is usually only little contaminated, carrying along only extremely small amounts of solid particles. Despite this known fact that most of the filtrate water occurs in the region of the feed opening, the filtrate water in the screw extruders of the prior art is collected in one and the same filtrate trough, or one filtrate trough, to be subsequently reintroduced into the process and, in particular, into the crude sludge.

Thus, screw extruders are, for instance, known, in which the screw shaft is mounted so as to be inclined relative to the horizontal line, and in which, in particular, the feed side is located deeper than the discharge side of the screw shaft so as to enforce, by the inclined disposition, additional conveyance of the filtrate water outflow in the direction to the feed side.

From EP-B 1 148 990, a screw extruder is, for instance, furthermore known, in which a device for preventing the obstruction of the filter zone on the feed side of the extruder is configured such that the filter tube and/or the filter sieve is/are driven to rotation, particularly on the feed side, in order to prevent an obstruction of the filter sieve, on the one hand, and to ensure the safe evacuation of excessive amounts of filtrate water in that region, on the other hand.

In addition, the most diverse screw extruders have already been provided, in which the mesh sizes of the filter sieves have been variably adaptable in order to be adapted to the respective degree of dehydration of the filter material and be able to safely cope with the discharge of the occurring amounts of filtrate in the feed region of the filter press, wherein all known screw extruders have in common that, although as complete and efficient a dehydration of the filter sludge is sought, the occurring filtrate, irrespectively of its composition, is in any event immediately returned to the process, or discarded, without trying to improve the overall energy balance of the screw extruder or feed the filtrate to immediate further use.

The present invention now aims to provide a screw extruder of the initially defined kind, by which it will be possible to not only safely and reliably dehydrate sludge or crude liquid to be dehydrated, but at the same time also separate the occurring filtrate in such a manner that, on the one hand, the filtrate can be immediately returned into the process and, on the other hand, those amounts of filtrate which may be used for other purposes can be directly discharged from the process, and further used, without additional purification or treatment.

SUMMARY OF THE INVENTION

To solve this object, the screw extruder according to the invention is characterized in that the screw shaft is configured to be cylindrical in the region of the feed opening for crude liquid, to conically widen towards the discharge opening in a central region of the screw extruder, and to be cylindrical in the region of the discharge opening, and that the filtrate trough disposed below the filter sieve is designed to comprise at least two chambers, or two mutually separate regions, which two chambers are each provided with an outlet for filtrate, and that the first chamber in the region of the feed opening has a longitudinal extension at least corresponding to the length of the cylindrically configured region of the screw shaft in the region of the feed opening for crude liquid.

In that the screw shaft is cylindrically configured in the region of the feed opening for crude liquid, it has become possible to allow a large portion of the excessive amount of liquid occurring in this region to run off directly from the filter or screw extruder without applying a pressure increase on the charged crude liquid in this region because of a change in the diameter of the screw shaft or a varying pitch of the screw blades. Due to the conical design of the screw shaft in the central region of the screw extruder, the pressure exerted on the crude liquid to be filtered or dehydrated, or the sludge to be dehydrated, will be continuously increased, thus continuously increasing the degree of dehydration. In that the end region of the screw shaft is again configured to be cylindrical, the pressure in the region of the screw extruder where the largest portion of liquid has already been filtered off and an almost completely dehydrated filter cake is present will not be further increased by a change in the diameter of the screw shaft or a change in the pitch of the screw blades, but only the discharge of the substantially solid filter cake will be ensured.

By designing the screw shaft in this manner, it will be ensured that the filtrate water occurring in the first cylindrical region will flow off through the openings of the filter sieve into the filtrate trough, which is designed with a separate first chamber in this region of the screw extruder, almost free of entrained solid particles due to the substantially pressureless guidance of the crude liquid in this region of the screw extruder. The filtrate water occurring in this region can thus be immediately separated from the system, i.e. from the sludge to be dehydrated and also from the remaining filtrate water still contained therein, without any further purification, filtering or other treatment, and directly fed to further use.

In that, as in correspondence with a further development of the present invention, the subdivision or chambering of the filtrate trough is configured such that the chamber in the region of the feed opening has a longitudinal extension of 10% to 35%, in particular 15% to 25%, of the length of the screw shaft, it will be safeguarded that nearly pure filtrate water, which is substantially free of suspended matter and entrained solid particles, will be collected in the region of the chamber below the feed opening of the screw extruder and, moreover, no post-treatment of this filtrate will be required before its recycling, thus not only resulting in a simplified hardware of the device, but, in particular, also markedly improving the overall energy balance of the same, due to the reduced amount of filtrate water to be treated.

Since, as in correspondence with a further development of the present invention, the screw extruder according to the invention is configured such that the outlet of the first chamber in the region of the feed opening is connected to the cleaning device for the filter sieve via a return line for filtrate, it has become possible by such a configuration to form, on the one hand, a substantially closed liquid circulation system in the interior of the screw extruder so as to enable not only a drastic reduction of the supply of fresh water, but also a marked improvement in the overall energy balance of the screw extruder, since the amount of filtrate loaded with suspended matter or particles and returned into the process can be markedly reduced. On the other hand, the total amount of water to be cleaned, or quantities to be returned to the crude liquid, has been markedly reduced so as to significantly enhance the energy balance of the whole screw extruder.

In that, as in correspondence with a further development of the present invention, the device is further developed such that a pumping device as well as a control device and a direct outlet are provided in the return line, an in particular rapid and reliable supply of the unloaded filtrate water to the cleaning device, or the nozzles of the cleaning device, at an appropriately adjusted supply pressure will be ensured. If required, excess filtrate water can thereby be directly purged off via the outlet so as to drastically reduce the overall amount of filtrate water to be supplied.

In order to safely avoid a backup of liquid in the region of the first chamber of the filtrate trough in the event of excessive amounts of filtrate water, and safeguard continuous operation, the invention is preferably further developed to the effect that an overflow from the first chamber in the region of the feed opening to the at least one further chamber in the region of the discharge opening is additionally provided. When providing such an overflow, not only a backup of liquid in the first chamber will be safely prevented, but it will further be ensured that, in the event of an excessive dehydration in the first part of the screw extruder, sufficient liquid and, in particular, sufficient filtrate will still be available to be returned into the crude liquid in order to enable charging of the crude liquid on the feed side with the correct and desired consistency and, in particular, a substantially constant solids content so as to not only ensure a continuous mode of operation of the entire screw extruder, but also provide for an overall low-maintenance device.

In order to ensure such a continuous operation of the device, the invention is preferably further developed such that the outlet of the at least one further chamber in the region of the discharge opening is connected, via a return device, to an intake, in particular a supply pump, for charging crude liquid. In that the outlet of the at least one further chamber in the region of the discharge opening is connected, via a return device, to an intake, in particular a supply pump, for charging crude liquid, not only the filtrate, which is heavily loaded with suspended matter or particles, will be immediately returned to the process in order to be redehydrated and hence freed from entrained sludge particles, but a liquid/solid particle ratio as constant as possible will additionally be adjusted in the crude liquid so as to enable the uniform and continuous operation of the entire plant without having to take into account varying process parameters, for instance by changing the speed of the extruder or the like, such that a continuous operation that remains constant over time and can thus be conducted in an energy-efficient manner will altogether be ensured.

Due to the fact that also the return device in the outlet of the at least one further chamber is provided with a pump, a control device, and a return line into the crude liquid intake, as well as a direct outlet, it is feasible, as a function of the process parameters, to adapt the plant to the respective requirements immediately and without changing the overall operating parameters, and to adjust a liquid/solid particle ratio as constant as possible in the crude liquid to be charged, in particular by the provision of the control device, e.g. a control valve, such that the entire screw extruder can be continuously operated over a long period of time, thus further improving the overall efficiency and, in particular, the energy balance of the plant.

In order to, in particular, safely and reliably drain the high amount of liquid occurring in the feed region of the screw extruder without simultaneously carrying major amounts of solid particles along with the filtrate, the screw extruder according to a preferred further development of the invention is configured such that the filter sieve is formed with oblong holes having semicircular end regions in the region of the first chamber and with round holes in the region of the at least one further chamber. By providing two different types of holes in the filter sieve, the excessive amount of liquid occurring in the feed region will, on the one hand, be taken into account, yet, by providing oblong holes having semicircular end regions, a filter sieve will, on the other hand, be provided, which will, on the one hand, be secured against excessive wear by the special shape of the holes and, on the other hand, safeguard that no excessive amounts of solid particles, or particularly large solid particles, will be entrained by the filtrate.

In that, as in correspondence with a preferred further development of the invention, the longitudinal extension of the oblong holes is 1.5 to 3 times the diameter of the round holes, it has become possible to safely and reliably evacuate the excessive amounts of liquid present in the region of the feed opening, yet without allowing the passage of major amounts of solid particles. Compared, for instance, to the provision of round holes having larger diameters, the formation of oblong holes will prevent the direct entrainment of particles, since the usually substantially spherical particle or sludge flakes will be safely held back on the edges of the oblong holes rather than be discharged through holes having enlarged diameters.

In order to ensure particularly complete cleaning of the filter sieve and, in particular, safely prevent the obstruction of the passage openings of the filter sieve, the invention is further developed to the effect that the cleaning device for the filter sieve is configured as at least one movably mounted nozzle assembly including spraying nozzles, and that the spraying nozzles of the nozzle assembly can be powered with a variable liquid pressure of a cleaning liquid at least partially containing filtrate from the first chamber of the filtrate trough.

Since the cleaning device is configured as at least one movably mounted nozzle assembly including spraying nozzles and the spraying nozzles of the nozzle assembly can be powered with a variable liquid pressure of a cleaning liquid at least partially containing, or consisting of, filtrate from the first chamber of the filtrate trough, it has become possible to control the cleaning of the filter sieve as a function of the degree of contamination of the same, in particular by continuously increasing the pressure exerted by the liquid on the spraying nozzles, for instance in the region of the screw shaft in which the latter is conically widened, so as to prevent any obstruction and safely reopen or purge already obstructed filter nozzles. In that the nozzle assembly is, moreover, movably mounted, it has become possible, by appropriate control, to selectively supply cleaning liquid even to those regions in which an obstruction has, for instance, already occurred, in order to make them passable again.

In that, as in correspondence with a preferred further development of the present invention, the device is further developed such that the nozzle assembly of the cleaning device substantially encompasses the entire periphery of the filter sieve and is capable of being driven to a reciprocating movement substantially sweeping the entire longitudinal extension of the filter sieve, it is possible to increase, on the one hand, the speed of the cleaning device during its reciprocating movement, in particular in the filter sieve region in which an excessive obstruction of the sieve holes is to be feared, and, on the other hand, also the residence time of the nozzle assembly in that region, such that, for instance, the filter sieve region in which no obstruction of the filter sieve is to be feared will be less frequently swept by the nozzle assembly than those regions in which an obstruction will actually have to be feared. In that substantially the whole filter sieve is encompassed by the nozzle assembly, the simultaneous cleaning of all the regions of the sieve drum or filter sieve that are possibly affected by obstruction will be safeguarded, and it will thus be possible to maintain a continuous operation of the screw extruder without requiring shutoffs or special cleaning runs for the sieve drum because of the obstruction of passage openings of the sieve drum.

In order to ensure an, in particular, rapid and reliable dehydration of the crude liquid in the feed region of the sieve drum and, in particular, the discharge of the substantially unloaded filtrate water in that region, the screw extruder according to a preferred further development of the invention is further developed such that the screw shaft comprises two screw blades with identical pitches and oppositely located starting points at least in the cylindrically configured region near the feed opening, preferably approximately in the region of the longitudinal extension of the first chamber in the region of the feed opening.

BRIEF DESCRIPTION OF THE DRAWINGS

In the following, the invention will be explained in more detail by way of exemplary embodiments illustrated in the drawing. Therein.

DETAILED DESCRIPTION OF THE INVENTION

Figure 1:
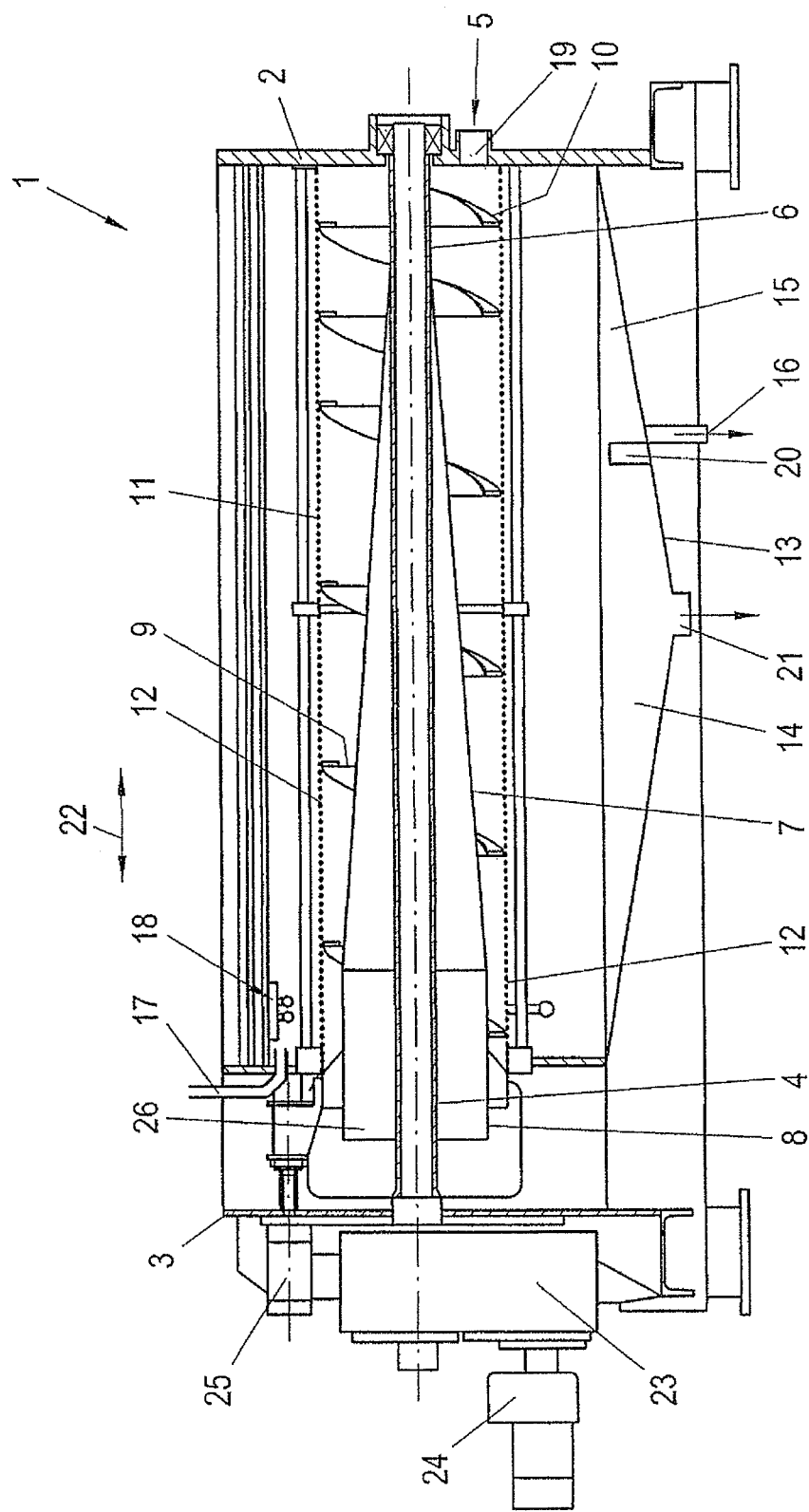
FIG. 1 depicts a longitudinal section through a screw extruder according to the invention including a filtrate trough having two chambers.

FIG. 1 depicts a longitudinal section of a screw extruder generally denoted by 1, in whose center a screw shaft 4 is formed, which is rotationally mounted in frames 2 and 3. The screw shaft 4 is configured in such a manner as to have a constant, cylindrical diameter 6 on the feed side 5 of the screw extruder 1, which widens in the central region of the screw extruder 1 in the form of a cone 7, and is again cylindrically designed in an end region 8 oriented to a discharge side. A screw blade 9 extending over the entire length of the screw shaft 4 with constant pitch is disposed on the screw shaft 4, wherein, in particular in the feed region 5 of the screw extruder 1, a second screw blade 10 is arranged, which, likewise, has the same pitch, yet a starting point located opposite that of the first screw blade 9, so as to reliably ensure further conveyance of the charged crude liquid and its dehydration in the feed region 5.

Figure 2:
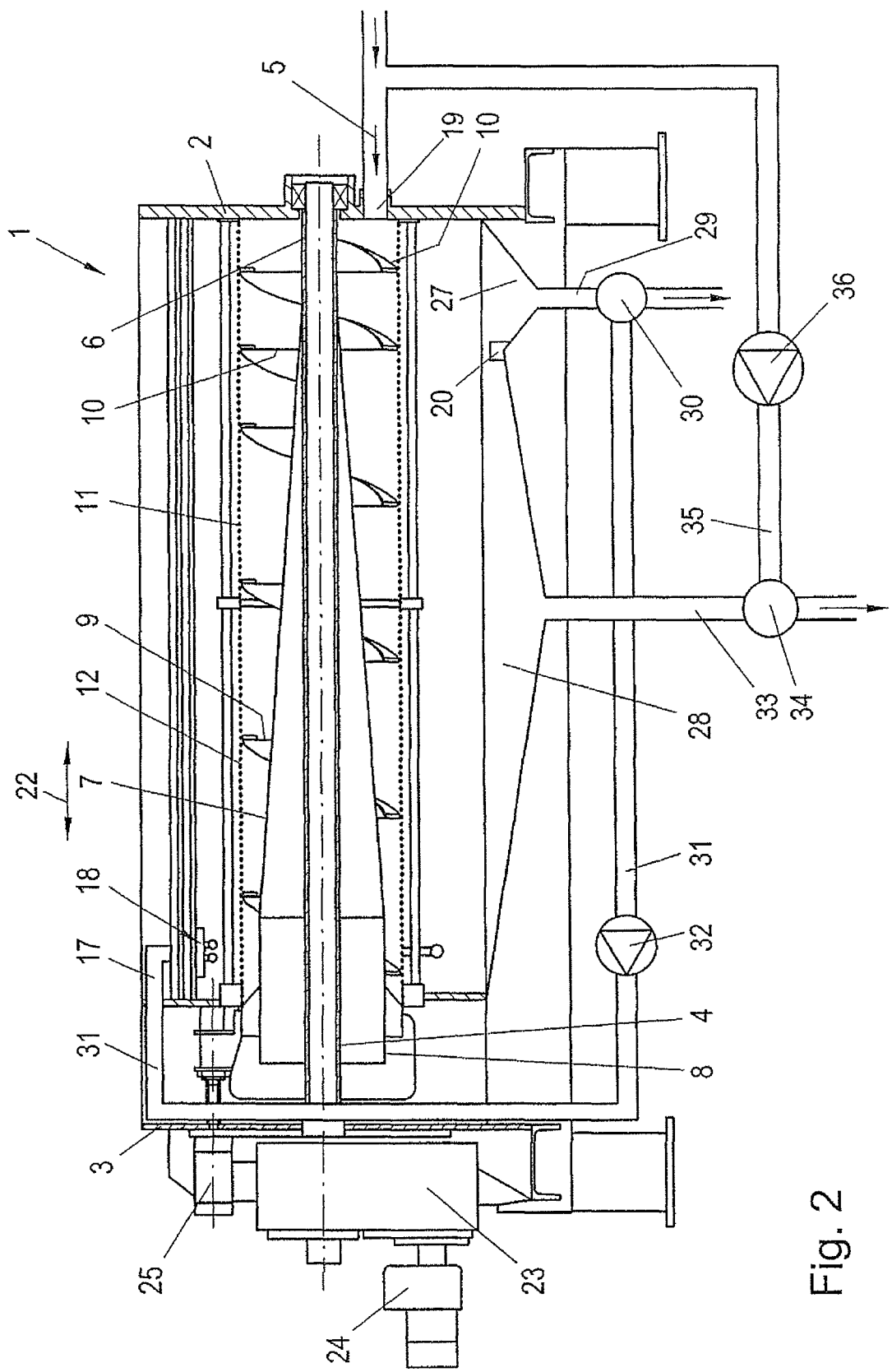
FIG. 2 depicts a longitudinal section through a modified configuration of the screw extruder according to FIG. 1.

The screw extruder 1 further comprises a filter sieve or filter drum 11 cylindrically surrounding the screw shaft 4 and including a plurality of filter openings 12, through which filter openings 12 the filtrate is discharged in the direction towards outside and, in particular, into the filtrate trough 13. The filtrate trough 13 in the illustration according to FIG. 2 is comprised of two chambers 14 and 15, wherein the filtrate chamber 15, which is mounted in the direction to the feed side 5 of the screw extruder 1, comprises a direct outlet 16, through which substantially unloaded filtrate is directly discharged from the system and/or fed into a schematically indicated supply line 17 of a cleaning device 18 for the filter sieve 11 via a return device not illustrated in detail in FIG. 1. The filtrate trough 15 in this case is configured in such a manner that its longitudinal extension is substantially equal to that of the region of the screw shaft 4 in which the latter, on the one hand, comprises two screw blades 9, 10 and, on the other hand, is substantially cylindrically designed (6). In this region of the screw shaft 4, the low-viscous material to be dehydrated is charged at 19 and, due to the high liquid freight of the crude liquid, substantially pure filtrate will flow off through the filter sieve in the first 10% to 30% of the longitudinal extension of the screw extruder without requiring the application of pressure or excessive powering of the crude liquid. The filtrate running off in this region is nearly free of suspended matter so as to be able to be supplied to further use.

In order to be able to safely handle the total, large amount of liquid occurring in this region, a weir 20 is provided between the chamber 15 and the chamber 16 of the filtrate trough 13, which weir 20 serves as an overflow such that, in the event of an excessive liquid occurrence, excess liquid can be immediately introduced into the usually larger, second chamber of the filtrate trough 13. The second chamber 14 of the filtrate trough 13 in this case also comprises an outlet 21, via which outlet 21 filtrate loaded with suspended matter will be discharged. The latter filtrate can, for instance, again be immediately admixed to the crude liquid and reintroduced into the screw extruder 1 via the feed or intake means 19. Such a partial return of more heavily loaded filtrate offers the advantages that, on the one hand, the crude liquid can be adjusted to a defined consistency and, on the other hand, the overall amount of loaded filtrate to be purified can be significantly reduced, by said liquid.

The cleaning device 18 for the filter sieve 11 can only be taken schematically from FIG. 1, said cleaning device 18 being configured in such a manner as to comprise a nozzle assembly 18 substantially encompassing the sieve drum 1, by which nozzle assembly 18 the filter nozzles will be cleaned by displacing or moving the cleaning device 8 in the longitudinal direction of the screw extruder 1 along arrow 22. The nozzles are disposed on the cleaning device 18 in a manner substantially completely surrounding the periphery of the filter sieve 11.

Merely for the sake of completeness, it is noted that the drive for the screw shaft 4 in the illustration according to FIG. 1 comprises a transmission 23 and a motor 24, and that a further motor 25 is provided for activating the opening and closing device and the adjustment of a filter cake discharge opening 26.

In the illustration according to FIG. 2, the reference numerals of FIG. 1 have been substantially retained, wherein only those parts of the device which differ from FIG. 1 are described anew.

In the illustration according to FIG. 2, the filtrate trough 13 is substantially differently designed than that of FIG. 1. The filtrate trough 13 according to FIG. 2 comprises two trough regions or chambers 27 and 28, wherein, analogously to the illustration of FIG. 1, the two troughs 27 and 28 are again separated by a weir 20, which is intended as an overflow for excess filtrate from the filtrate trough 27 into the filtrate trough 28.

The outlet 29 of the filtrate trough 27 in this case is provided with a directional control valve 30, via which the filtrate can either be discharged from the system or fed to the cleaning device 18 via a return line 31 including a pump 32, in order to again serve as a cleaning liquid for the filter sieve 11.

The pump 32 in this case is of particular importance in order to enable the appropriate control of the feed pressure to the nozzles of the device 18 so as to enable a more or less high cleaning pressure to be applied on the filter sieve 11 as a function of the degree of contamination of the filter sieve 11. In doing so, the liquid pressure exerted on the nozzles of the cleaning device 18 can, of course, also be varied as a function of the position of the cleaning device 18 above the filter sieve, and hence as a function of the contamination or obstruction of the same (sense of arrow 22), such that a cleaning pressure higher than that on the feed end 5 of the screw extruder 1 can, for instance, be applied on the discharge end of the same.

According to the configuration of FIG. 2, also the second filtrate trough 28 is provided with a direct outlet 33, in which a valve 34 is likewise provided to either return the laden filtrate to the crude liquid intake 19 or discharge the same from the system and supply it to a separate cleaning device.

A pump 36 is again provided in the return line 35 for the filtrate to the crude liquid intake 19, yet this pump, unlike pump 32, is merely provided to maintain a constant feed pressure or feed amount of filtrate loaded with suspended matter or waste substances to the crude liquid intake 19.

Figure 3:
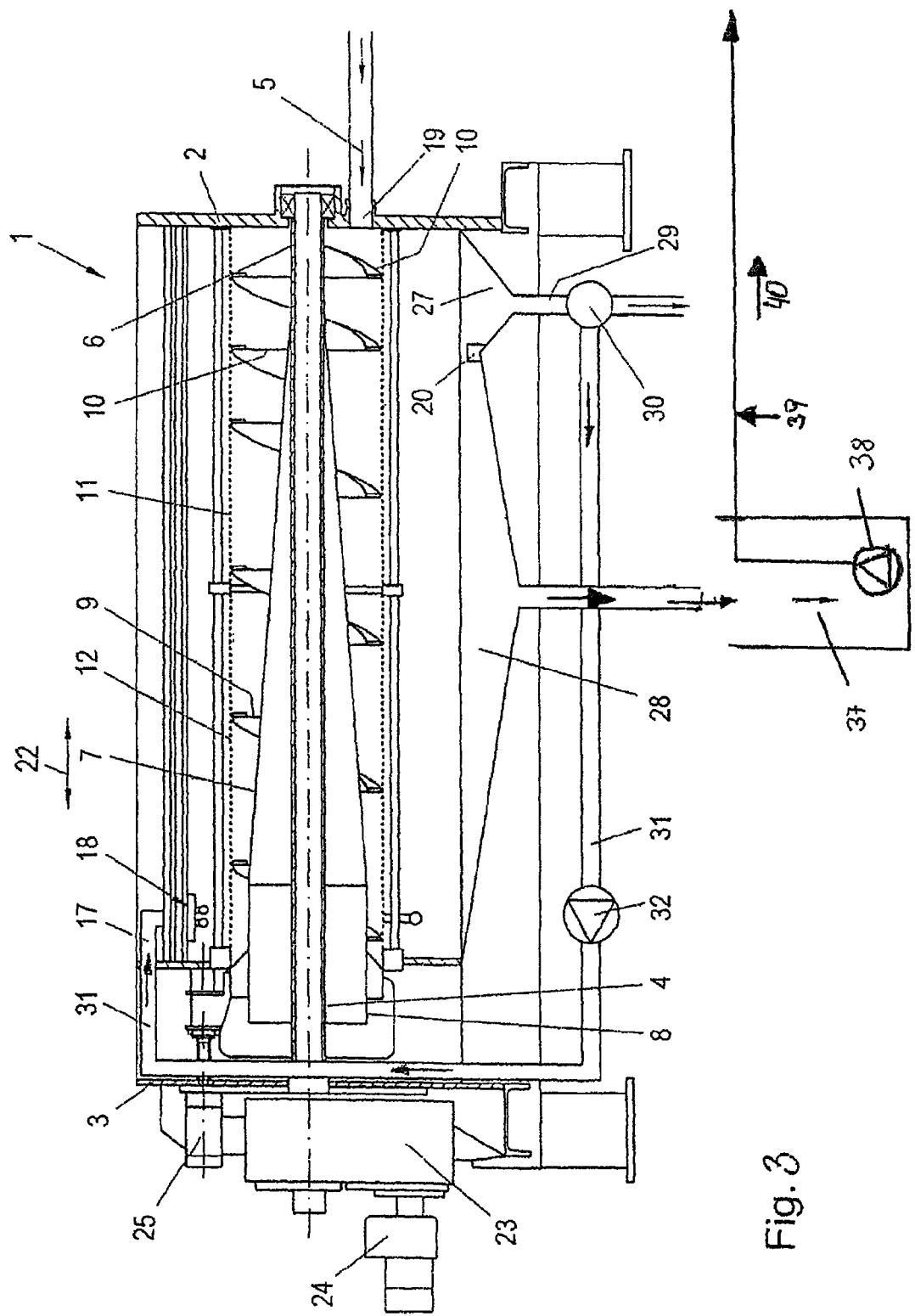
FIG. 3 depicts a longitudinal section through the screw extruder according to FIG. 1, with a modified configuration of the filtrate return line.

FIG. 3, in which the whole screw extruder and the outlet means are substantially configured in the same manner as in FIG. 2, differs from FIG. 2 in that the filtrate collected in the second filtrate trough 28, which is more strongly laden with waste substances, is introduced into a storage tank 37 via outlet 33. In the storage tank, a pump 38 is provided to feed drained liquid from the storage tank 37 in the sense of arrow 40 to a screw extruder charging line not illustrated. Further devices such as a flow meter, dosing means for possibly required additional substances and, optionally, further measuring probes may be positioned in said feed line.

It goes without saying that combinations of the variants of FIGS. 2 and 3 with, for instance, storage tanks and three-way valves may be envisaged without leaving the scope of the present invention. Additional charging devices, for instance, for additives for the waste water to be purified such as flocculation aids or the like may be further provided.

In the main, it has thus become possible by the device according to the present invention to largely recycle the waste liquids discharged during a filtering process such that the overall liquid waste amount will be markedly reduced and the overall energy balance and, in particular, also the balance of the fresh water to be used, will, moreover, be significantly enhanced relative to conventional plants due to the recirculation of the filtrate.

The invention claimed is:

1. A screw extruder comprising a screw shaft rotationally mounted in oppositely located frames and having a conically widening diameter between an inlet port for crude liquid and a discharge port for dehydrated material, and on which screw shaft at least one screw blade extending at a substantially constant pitch is disposed, wherein a filter screen cylindrically surrounding the screw shaft and including a plurality of filter openings is further arranged within the frames, wherein a cleaning device with a plurality of cleaning nozzles for the filter screen and a funnel-shaped filtrate trough disposed below the filter screen are additionally arranged on the outer side of the filter screen, wherein the screw shaft is configured to be cylindrical in the region of the inlet port for crude liquid, to conically widen in the direction towards the discharge port in a central region of the screw extruder, and to be cylindrical in the region of the discharge port, and that the filtrate trough disposed below the filter screen is configured to comprise at least two chambers, or two mutually separated portions, which two chambers are each provided with a drain for filtrate, that the first chamber of the at least two chambers in a region of the inlet port has a longitudinal extension corresponding to at least the length of the cylindrically configured portion of the screw shaft in the region of the inlet port for crude liquid, and that the drain of the first chamber in the region of the inlet port is connected, via a return line for filtrate, to the cleaning device for the filter screen to recirculate the filtrate.

2. The screw extruder according to claim 1, wherein the chamber, in the region of the inlet port, has a longitudinal extension of 10% to 35%, in particular 15% to 25%, of the length of the screw shaft.

3. The screw extruder according to claim 1, wherein a pumping device as well as a control device and a direct drain are provided in the return line.

4. The screw extruder according to claim 1, wherein an overflow from the first chamber in the region of the inlet port to the at least one further chamber of the at least two chambers in a region of the outlet port is additionally provided.

5. The screw extruder according to claim 1, wherein the drain of the at least one further chamber of the at least two chambers in a region of the outlet port is connected, via a return device, to an intake, for charging crude liquid.

6. The screw extruder according to claim 5, wherein the return device is provided with a pump, a control device, and a return line into the intake for crude liquid, and with a direct drain.

7. The screw extruder according to claim 1, wherein the filter screen is formed with elongated holes having semicircular end portions in the region of the first chamber and with round holes in the region of the at least one further chamber.

8. The screw extruder according to claim 7, wherein the longitudinal extension of the elongated holes corresponds to approximately 1.5 to 3 times the diameter of the round holes.

9. The screw extruder according to claim 1, wherein the cleaning device for the filter screen is configured as at least one movably mounted nozzle assembly comprising spraying nozzles, and that cleaning liquid at least partially containing filtrate from the first chamber of the filtrate trough can be supplied to the spraying nozzles of the nozzle assembly at a variable liquid pressure.

10. The screw extruder according to claim 9, wherein the nozzle assembly of the cleaning device substantially encompasses the entire periphery of the filter screen and is drivable to a reciprocating movement covering the entire longitudinal extension of the filter screen.

11. The screw extruder according to claim 1, wherein the screw shaft at least in the cylindrically configured region of the inlet port, approximately in the region of the longitudinal extension of the first chamber, in the region of the inlet port comprises two screw blades having opposite starting points and identical pitches.

* * * * *